April 30, 1968 E. W. BROCK ETAL 3,381,169

SOLID STATE CRYSTAL AUTOMATIC HEADLIGHT-DIMMING SYSTEM

Filed March 11, 1966 2 Sheets-Sheet 1

INVENTORS
Eugene W. Brock
Myrneth L. Woodward
& Charles W. Miller
Robert E. Fowler
ATTORNEY April 30, 1968 E. W. BROCK ET AL 3,381,169

SOLID STATE CRYSTAL AUTOMATIC HEADLIGHT-DIMMING SYSTEM

Filed March 11, 1966 2 Sheets-Sheet 2

INVENTORS
Eugene W. Brock
Myrneth L. Woodward
& Charles W. Miller
Robert E. Fowler
ATTORNEY United States Patent Office 3,381,169

Patented Apr. 30, 1968

3,381,169

SOLID STATE CRYSTAL AUTOMATIC HEADLIGHT-DIMMING SYSTEM

Eugene W. Brock, Anderson, Myrneth L. Woodward, Lapel, and Charles W. Miller, Anderson, Ind., assignors to General Motors Corporation, Detroit, Mich., a corporation of Delaware Filed Mar. 11, 1966, Ser. No. 533,727

10 Claims. (Cl. 315—83)

ABSTRACT OF THE DISCLOSURE

This invention relates to specific improvements in light sensitive control systems for automatic headlamp-dimming utilizing a solid state crystal such, for example, as cadmium sulphide, as a light sensitive element, amplifying means with a multivibrator trigger control circuit, and novel dim-hold and driver sensitivity control circuits associated therewith.

*State of the prior art*

Automatic light sensitive control systems for operating automobile headlamps between high and low beam positions have been the subject matter of patents and have been marketed in various forms for some time. However, considering only the prior art pertinent to the improvements in the present system over those previously known are Willis, 2,718,612, Phototube Circuit, issued September 20, 1955, and Atkins, 2,842,721, Control Circuit, issued July 8, 1958.

*Description of the invention*

Figure 1:
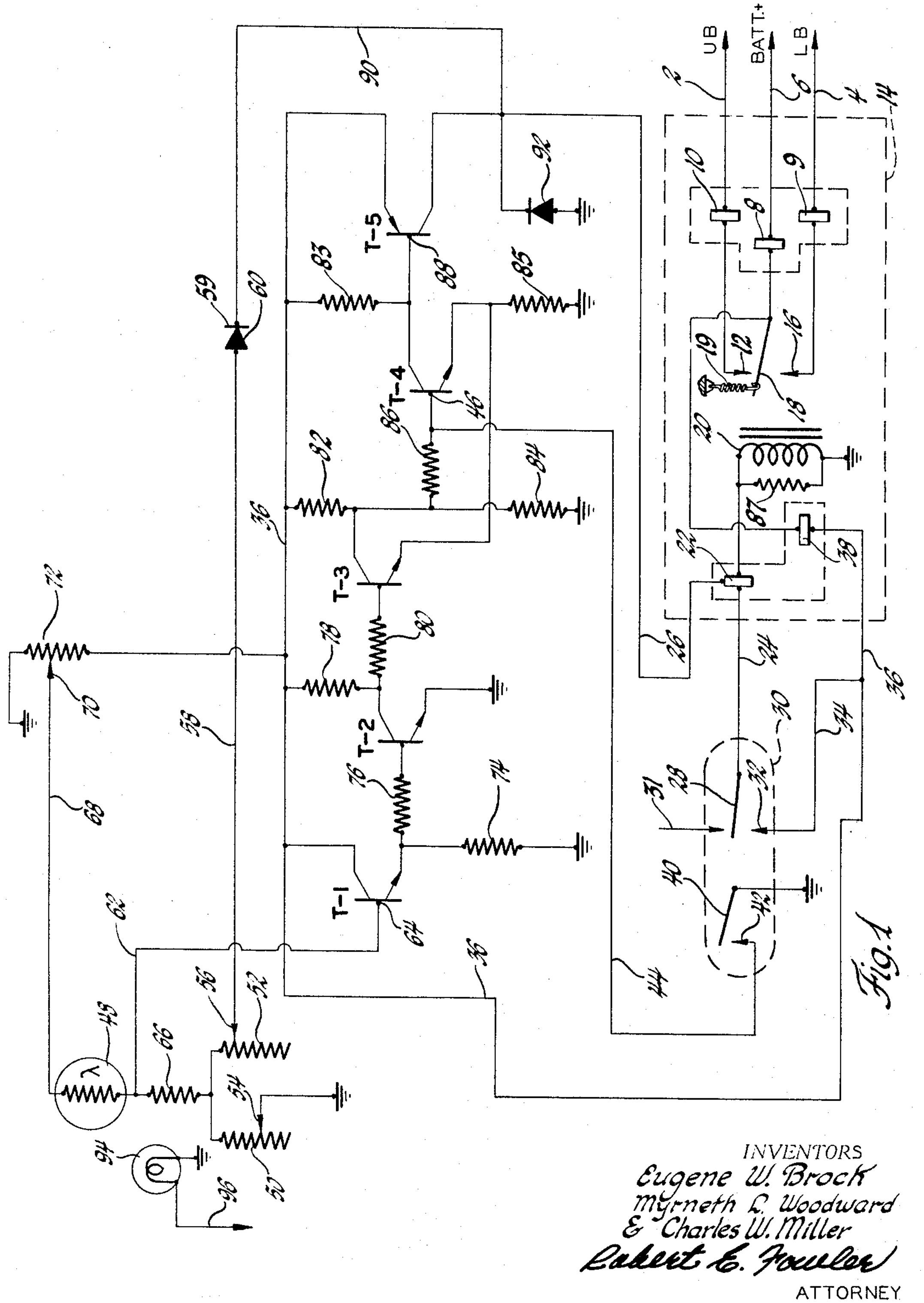
Figure 2:
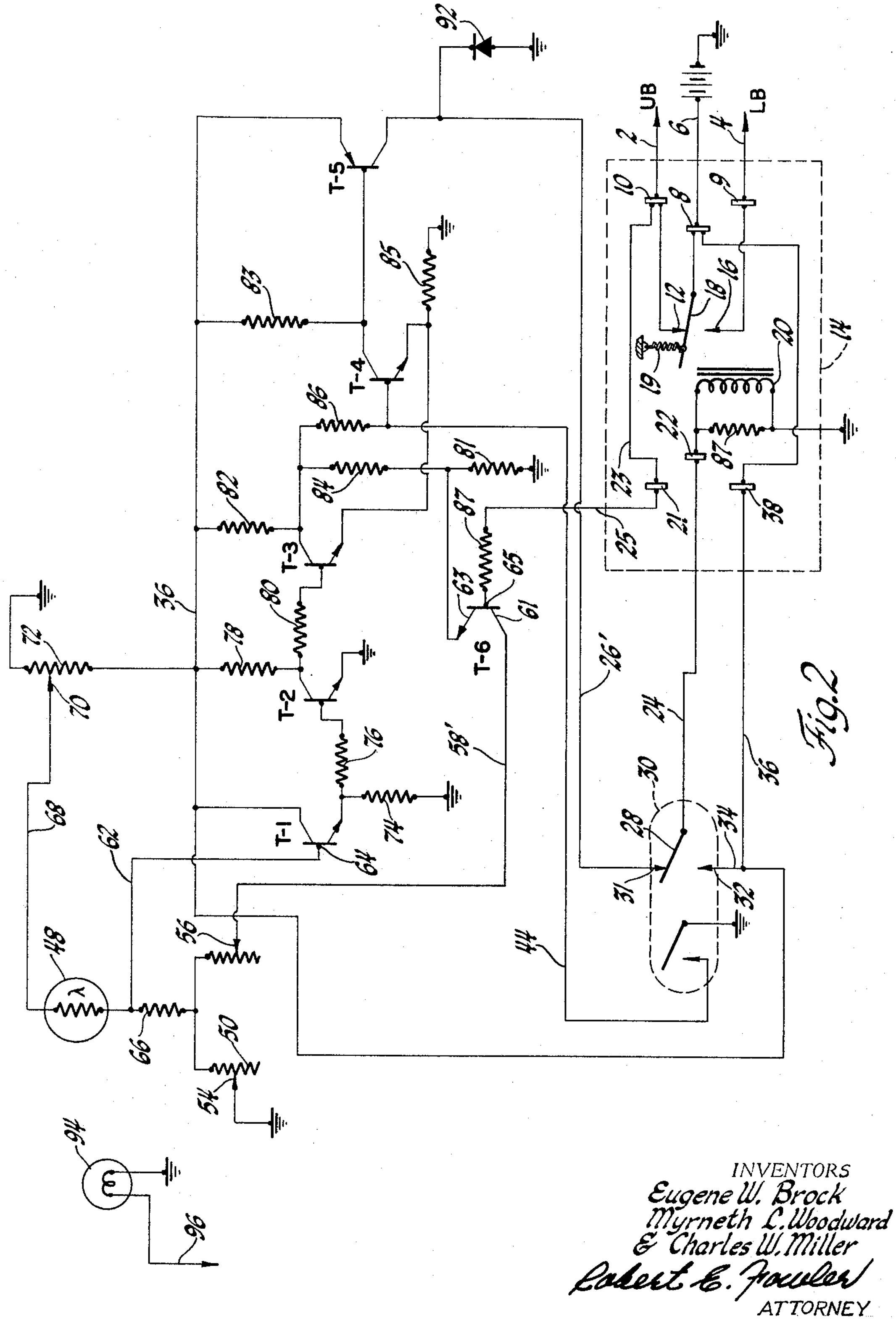

The present invention will be best understood by reference to the following specification and the illustrations in the accompanying drawings in which:

FIGURE 1 is a circuit diagram of a system embodying the various novel features; and, FIG. 2 is a similar circuit diagram of a control system of a modified form.

Systems which have previously been utilized to automatically dim headlamps in automotive vehicles have required sensitive and relatively expensive light sensitive means and in some instances light sensitive means which required higher voltages than normally available on automotive vehicles so that special voltage supplies had to be provided. A solid state crystal device, such as a cadium sulphide crystal, is a very inexpensive practical light sensitive element and if the associated circuit can be devised to be sufficiently sensitive and fast acting enough to answer the various requirements of the control will be satisfactory. The present system provides such action.

Referring to FIG. 1 of the drawing, there is shown an incoming line 2 labeled UB which is adapted to be connected to the upper beam filaments, and a second line 4 labeled LB which is connected to the lower beam filaments. A third voltage supply line 6 extends to the battery and is labeled BAT+. These three lines are connected to terminals 8, 9 and 10 on a power relay 14. Terminal 10 is connected to one stationary contact 12 of power relay 14. Terminal 9 is connected to the opposite stationary contact 16. Movable armature 18 of the relay oscillates between the two stationary contacts 12 and 16 and is spring biased upwardly by spring 19. It is moved to its lower position by current flow through an operating coil 20.

One end of the power relay coil is connected to ground as shown. The opposite end is connected to terminal 22 of the relay through which it is connected to two other lines 24 and 26. Line 24 extends to the movable armature 28 of one section of a foot switch 30. Armature 28 is a portion of the control and override switch 30 for setting the system for either automatic or manual operation. It is an over-center switch. When it is snapped down into engagement with its lower contact 32 it is electrically connected to line 34 which is a power input line and this causes the relay coil 20 to be energized under any conditions and maintains armature 18 of the power relay in its lower position and the lower beams only energized. When the armature 28 of the foot switch is in its upper position the system is in "atuomatic" condition. Line 34, just mentioned, is connected to power line 36 which extends to a terminal 38 which is interconnected to power terminal 8 and incoming line 6. It further extends to the various elements of the amplifier sections to be described to provide power for the system. Manual control and override switch 30 has a second portion which is used for override purposes. This section includes a manually operable switch arm 40 which is grounded and which is adapted to engage a stationary contact 42 connected through line 44 back to the base 46 of transistor T–4. When this switch is depressed, if the system is in automatic operation, it will be overridden to de-energize the power and to place the beams on high beam operation.

As previously mentioned the light sensitive element in this particular system is a solid state crystal cell 48 which can, for example, be made of cadmium sulphide. This is adapted to be encased in a housing and behind a light focusing lens which is trained on the road ahead. Also, in this housing there are adapted to be mounted adjustable resistances including resistance elements 50 and 52 over which contacts 54 and 56 move for varying the amount of resistance in circuit. Adjustable tap 54 is directly grounded while adjustable tap 56 is connected through line 58 to a blocking diode 60 whose purpose will be later more specifically explained. One contact of the light sensitive crystal 48 is connected through line 62 to the base 64 of transistor T–1 and also to one contact of a fixed resistance element 66, the opposite side of which is connected to a common terminal of resistors 50 and 52. The opposite terminal of light sensitive cell 48 is connected through line 68 to an adjustable tap 70 which moves over a resistor 72 providing driver sensitivity control. One end of the resistor 72 is grounded and the other is connected directly to power line 36. Thus, the position of tap 70 determines the amount of voltage applied to the light sensitive cell 48. Movement downward increases the amount of voltage applied, whereas upward movement decreases it.

Transistors T–1, T–2, T–3 and T–4 are all NPN transistors and this example of the unit are silicon planar transistors. The first is an impedance matching stage, the second an amplifier. The next two stages are a multivibrator regenerative trigger circuit. The collector of the first transistor T–1 is connected directly to the power line 36 and the emitter through a biasing resistor 74 to ground. A resistor 76 is connected between the emitter of the transistor T–1 and the base of the transistor T–2 for coupling. The emitter of transistor T–2 is connected directly to ground and the collector of that transistor is connected to the power line through biasing resistance 78 and to the base of transistor T–3 through resistor 80. A voltage divider comprising resistors 82 and 84 is connected between the power line 36 and ground and the collector of transistor T–3 is connected to a point intermediate the two resistors as well as one terminal of resistor 86, the other terminal of which is connected to the base 46 of transistor T–4.

The ouput of this amplifier unit controls transistor T–5 which acts merely as a control unit for the power relay 14. The collector of transistor T–4 is directly connected to the base 88 of transistor T–5 and, therefore, controls the flow of current therethrough while the collector of transistor T–5 is directly connected to line 26 which extends to terminal 22 of the power relay 14 which is connected to the operating coil 20. Line 90 connects one terminal of the blocking diode 60 with line 26. A further absorbing diode 92 is inversely connected between line 26 and ground to provide a discharge path when the field of coil 20 collapses.

The casing which supports the light sensitive cell 48 has integrally built into the same a small calibrating light bulb 94. One terminal of this light bulb is grounded and the other terminal brought out as a lead. This bulb is potted in the housing with the cell and the resistors 66, 50 and 52. The unit may be initially calibrated as follows: with the system connected to suitable power supply, the driver sensitivity control 70–72 is first set at its midpoint. Since this element is connected between the 12 volt line 36 and ground this will apply 6 volts to the photocell 48 through line 68. Variable hold control 50–54, which determines the point at which the lights will switch back to high beam, is adjusted to the maximum resistance value or contact point 54 is moved to the low end of resistor 50. The dim control 52–56 is adjusted to minimum resistance value or at the top of resistance 52. The photocell 48 is now exposed to the dim light level of intensity or the point at which it is desired to cause the system to dim. Adjustable contact member 56 is then moved along resistance 52 introducing more and more resistance until power relay 14 switches to low beam. At this point line 26 is at +12 volts. This raises the cathode 59 of diode 60 so that it is more positive than its anode so the diode becomes non-conductive. It acts as a switch and line 58 is now effectively open so resistance 52 does not have a ground return and no current from the 6-volt source at adjustable point 70 through the photocell 48 will pass through resistance 52. All the current from the photocell will instead flow through variable resistance 50–54 to ground. This acts as the proper adjustment for the dim control.

The level of light falling on the photocell 48 is then reduced to approximately one-eighth of the dim light level or the level which was required to cause the same to switch to dim. Variable resistor arm 54 is now moved upwardly over resistor 50 to reduce the resistance until the power relay switches the headlamps back to upper beam. This adjustment is now satisfactory for the light level at which to return to high beam energization. The unit is now factory adjusted as far as the adjustments of the "hold" variable resistance 50–54 and the "dim" variable resistance 52–56 are concerned. Once these have been factory adjusted the whole unit is sealed and it is not necessary to move these adjustments again. The lamp 94 which is supported in the same casing is used for calibration and the setting of the same for calibration purposes will now be explained. After the adjustment of the two variable hold and dim resistors 50 and 52 the photocell is covered with a black cloth so that no outside light may enter the casing. The only light which may then impinge upon the photocell is from the calibrating or test bulb 94. Its lead 96 is now connected to a variable voltage source. With the system still fully connected to the power source the voltage on the test bulb 94 is gradually raised until the power relay 14 switches the light to low beam. The voltage which is applied to the test bulb at that point is recorded. Next the voltage on the lead 96 is slowly reduced and at the point where the lights switch back to upper beam the second voltage is recorded. These two voltages represent "dim" and "hold" light levels and they are recorded on a service label attached to the die cast housing. This, therefore, provides a means for the serviceman to determine if the system has maintained proper adjustments after it has reached the field. The only purpose of the bulb is to provide such calibrating or checking means. Any driver control of the switching of beams is provided by changing the sensitivity control 70–72.

*Operation*

When the light sensitive element and its subassembly together with the switches have been mounted and various connections have been made, the control system operates in the following manner. Let it be assumed that the manual-automatic switch element 28 of control switch 30 is placed in its upper or automatic position. Power is supplied to the line 36 from the battery lead 6 directly to the line 36 and to the control set. Assuming that there is substantially no light or very little light falling on the photocell 48 and it is dark in the ambient area of the vehicle upon which the device is mounted, the resistivity of the cell 48 is high and the bias on the base 64 is such as to cause the transistor T–1 to be cut off. Since this transistor is not conductive the voltage on the base of the second transistor T–2 is also low and that transistor will be non-conductive. Under these conditions transistor T–3 which forms part of a multivibrator regenerative circuit is conductive and since it is conductive it holds transistor T–4 cut off. This permits the voltage on the base 88 of transistor T–5 to be high and that transistor is non-conductive. With transistor T–5 non-conducting power line 36 is not connected through the emitter-collector circuit of the same to the power relay coil 20 and that is de-energized allowing spring 19 to pull up its armature 18 and its engagement with contact 12 causes the upper beam filaments to be energized.

As long as the dark condition remains the upper beam filaments are energized and the vehicle proceeds. Upon the approach of a vehicle from the opposite direction which introduces sufficient light focused on the cell 48 to operate the system, said application of light reduces the resistance of the cell 48 to increase the voltage on line 62 and upon base 64 of transistor T–1. At a given setting of incident light intensity, transistor T–1 conducts. This raises the voltage on the base of transistor T–2 causing that transistor to likewise conduct. When this occurs the voltage on the base of transistor T–3 is reduced, causing that transistor to turn off, which in turn through a regenerative trigger action increases voltage on base 46 to turn on transistor T–4. When this transistor turns on it reduces the voltage on base 88 of transistor T–5 causing that transistor to conduct and coil 20 to be energized so that it pulls on its armature 18 to engage contact 16, de-energizing the high beam and energizing the low beam filament through an obvious circuit.

If the voltage generated by the collapse of the field in relay coil 20 increases the voltage in line 26 above the rated back voltage of diode 92, it will break down discharging through this diode to ground but will, of course, immediately permit normal voltage to be held. Blocking diode 60 maintains one way conduction in line 90. Also, if the operator desires to discontinue automatic operation he may move the switch arm 28 to "manual" position which maintains the lights in low beam position under all conditions. Switch 40–42 is an override to return lights to high beam position. If the foot switch is in automatic position, and there is sufficient light on the photocell 48 to cause the same to have switched to low beam, the device may override this action and return to high beam by closing switch 40–42. This grounds the base 46 of T–4 to cut it off and also T–5 to deenergize relay coil 20 allowing the spring 19 to return the armature 18 to high beam position.

The modification of the invention shown in FIG. 2 is basically the same circuit as that of FIG. 1. The primary difference is that the switching diode 60 has been replaced with a transistor T–6 which performs the same function. In addition another terminal connection 21 has been made to the power relay 14 and the foot switch 30 connections have been slightly changed. In FIG. 2 like elements are identified by the same reference characters used in FIG. 1. Since diode 60 has been omitted, line 58' from adjustable contact 56 now is connected directly to the collector 61 of transistor T–6. The emitter 63 of T–6 is connected to a point in the voltage divider between resistors 84 and 81. The base 65 of transistor T–6 is connected through resistor 87 and line 25 to the new terminal 21 of the power relay 14. Tie line 23 interconnects terminal 21 with terminal 10 in the power relay. In FIG. 2 fixed contact 31 of the foot switch is directly connected to the collector of transistor T–5 through line 26'. The remainder of the system is the same as FIG. 1.

In this version the dim control 52–56 is connected to ground or disconnected therefrom by transistor T–6. The operation of this system is as follows. With the system properly connected to a power source and no light falling on the photocell 48, the power relay 14 is de-energized and spring 19 holds armature 18 in its upper position to energize the high beam filaments. Simultaneously +12 volts is applied to the base 65 of transistor T–6 from line 6, terminal 8, armature 18, contact 12, terminal 10, line 23, terminal 21, line 25 and resistance 87. A voltage of +12 is also applied to line 36 through terminal 38. This provides a voltage of approximately +.15 at the junction of resistors 81 and 84 in the voltage divider 82–84–81 between line 36 and ground. This determines the potential on emitter 63. Under these conditions the base is at a higher potential than the emitter, the transistor T–6 is turned on and the collector 61 is, therefore, at +.15 volts, virtually clamping contact 56 to ground.

With foot switch 30 in automatic position (armature 28 in engagement with contact 31), line 26' interconnects the transistor T–5 and relay coil 20 so that the conductivity of T–5 determines relay energization. If now light of the dimming level falls on the photocell 48, then transistor T–5 is turned on as before described with reference to FIG. 1 and relay coil 20 is energized to attract its armature 18 and switch to low beam energization. The base 63 of transistor T–6 is now disconnected from the power source of +12 volts by the opening of switch 18–12 and grounded through the upper beam filaments through an obvious circuit. Since the emitter at +.15 volts is now at a higher voltage than the base it will be turned off to disconnect contact 56 from ground and adjustable rheostat 50–54 is the only ground path for photocell 48. Thus transistor T–6 performs the same function as diode 60 in FIG. 1. However, diode 60 must have very high back resistance and careful selection is necessary while transistors completely cut off and careful selection is not required.

Due to a change in connections to the foot switch 30, when armature 28 is moved to manual or lower position, line 26' is disconnected and transistor T–5 isolated from power relay 14 so it cannot be actuated.

What is claimed is:

1. Automatic light sensitive control means for switching multibeam headlamps in an automotive vehicle comprising relay switching means connected in circuit with the multibeam headlamps to cause energy to be supplied thereto and alternately cause either one set of beams or the other to be energized, automatic control means for the relay switching means including a solid state light sensitive element mounted on the vehicle in a position to receive incident light projected on the vehicle from approaching vehicles, a multivibrator connected to the light sensitive element so as to be triggered thereby, a transistor having an input circuit and an output circuit, the transistor input circuit being connected to the multivibrator and the transistor output circuit being connected to the relay switching means, a plurality of variable resistance elements connected in parallel from the light sensitive element to ground and to the relay switching means to provide an adjustable control for the incident light value at which the headlamps will switch from one set of beams to the other and return, and switching means in the one parallel circuit to the relay switching means to disconnect that variable resistance in the one parallel circuit from ground when in the non-conducting state so as to avoid the return of the headlamps to the one set of beams until the value of the incident light is a predetermined amount less than the value of the incident light at which the headlamps are switched from the one set of beams to the other.

2. Automatic light sensitive control means for switching multibeam headlamps in an automotive vehicle as defined in claim 1 in which the switching means is a diode.

3. Automatic light sensitive control means for switching multibeam headlamps in an automotive vehicle as defined in claim 1 in which the switching means is a transistor.

4. Automatic light sensitive control means for switching multibeam headlamps in an automotive vehicle as defined in claim 1 in which the switching means is a transistor having emitter, collector and base electrodes, the emitter and the collector electrodes being connected in a circuit from the variable resistance to ground, and a conductor from the relay switching means to the base electrode to provide a trigger control bias for the multivibrator depending upon the position of the relay switching means.

5. Automatic light sensitive control means for switching multibeam headlamps in an automotive vehicle comprising relay switching means connected in circuit with the multibeam headlamps to cause energy to be supplied thereto and alternately cause either one set of beams or the other to be energized, automatic control means for the relay switching means including a solid state light sensitive element mounted on the vehicle in a position to receive incident light projected on the vehicle from approaching vehicles, a multistage solid state amplifier having an input circuit and an output circuit, said input circuit being connected to the light sensitive element to amplify the signals therefrom, a multivibrator connected to the output circuit of the amplifier and triggered by the same, a transistor having an input circuit and an output circuit, said transistor input circuit being connected to the multivibrator and said relay switching means in said transistor output circuit so that the amount of light falling on the solid state light sensitive element will determine which set of beams is energized by the transistor's operation of the relay switching means, a diode connected between the output circuit of the transistor controlling the relay switching means and ground and so poled as to normally prevent flow of current to ground but to conduct in the reverse direction to absorb the energy in the collapsing relay switching means field if the applied voltage exceeds a predetermined amount, and a second diode connected between the same output circuit of the transistor and the solid state light sensitive element similarly poled to act as a blocking diode.

6. Automatic light sensitive control means for switching multibeam headlamps in an automotive vehicle comprising relay switching means connected in circuit with the multibeam headlamps to cause energy to be supplied thereto and alternately cause either one set of beams or the other to be energized, and automatic control means for the relay switching means and including a solid state light sensitive element mounted on the vehicle in a position to receive incident light projected on the vehicle by approaching vehicles, a multistage solid state amplifier having an input circuit and an output circuit, the input circuit being connected to the light sensitive element to amplify the signals therefrom, a multivibrator connected to the amplifier so as to be triggered thereby, a transistor having an input circuit and an output circuit, the transistor input circuit being connected to the multivibrator and the transistor output circuit having the relay switching means therein so that the amount of light falling on the solid state light sensitive element will determine which set of beams is energized by the transistor's operation of the relay switching means, a power supply line connected to the solid state amplifier, to the multivibrator and to the transistor to supply operating voltages and biases thereto, a variable resistor connected between said power supply line and one side of said solid state light sensitive element to provide a sensitivity control for the system, and a plurality of variable resistance elements connected in parallel from the opposite side of said solid state light sensitive element to ground and to the relay switching means to provide an adjustable control for the incident light value at which the system will switch from one set of beams to the other and to return.

7. Automatic light sensitive control means for switching multibeam headlamps in an automotive vehicle comprising relay switching means connected in circuit with the multibeam headlamps to cause energy to be supplied thereto and alternately cause either one set of beams or the other to be energized, and automatic control means for the relay switching means and including a solid state light sensitive element mounted on the vehicle in a position to receive incident light projected on the vehicle by approaching vehicles, a multistage solid state amplifier having an input circuit and an output circuit, the input circuit being connected to the light sensitive element to amplify the signals therefrom, a multivibrator connected to the amplifier so as to be triggered thereby, a transistor having an input circuit and an output circuit, the transistor input circuit being connected to the multivibrator and the transistor output circuit having the relay switching means therein so that the amount of light falling on the solid state light sensitive element will determine which set of beams is energized by the transistor's operation of the relay switching means, a power supply line connected to the solid state amplifier, to the multivibrator and to the transistor to supply operating voltages and biases thereto, a variable resistor connected between said power supply line and one side of said solid state light sensitive element to provide a sensitivity control therefor, and a plurality of variable resistance elements connected in parallel from the opposite side of said solid state light sensitive element to ground and to the relay switching means to provide an adjustable control for the incident light value at which the headlamps will switch from one set of beams to the other and return, and switching means in the one parallel circuit to the relay switching means to disconnect that variable resistance in the one parallel circuit from ground when in a non-conducting state.

8. Automatic light sensitive control means for switching multibeam headlamps in an automotive vehicle as defined in claim 7 in which the switching means is a diode.

9. Automatic light sensitive control means for switching multibeam headlamps in an automotive vehicle as defined in claim 7 in which the switching means is a transistor.

10. Automatic light sensitive control means for switching multibeam headlamps in an automotive vehicle as defined in claim 7 in which the switching means is a transistor having an emitter, collector and base electrodes, said emitter and collector electrodes being connected in a circuit from the variable resistance to ground, and a conductor from the relay switching means to the base electrode to provide a trigger control bias for the multivibrator depending upon the position of the relay switching means.

References Cited

UNITED STATES PATENTS

| | | | |
|---|---|---|---|
| 3,177,397 | 4/1965 | Keeran | 315—83 |
| 3,283,161 | 11/1966 | Ubukata et al. | 315—83 X |
| 3,319,116 | 5/1967 | Schick | 315—83 |

FOREIGN PATENTS

| | | |
|---|---|---|
| 624,122 | 7/1961 | Canada. |

JAMES W. LAWRENCE, *Primary Examiner.*

R. JUDD, *Assistant Examiner.*